(12) United States Patent
Wheatley

(10) Patent No.: US 10,810,389 B2
(45) Date of Patent: Oct. 20, 2020

(54) DYNAMIC DATA CAPTURE DEVICE CONFIGURATION

(71) Applicant: Zebra Technologies Corporation, Lincolnshire, IL (US)

(72) Inventor: Sean Wheatley, Sandhurst (GB)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/213,432

(22) Filed: Dec. 7, 2018

(65) Prior Publication Data
US 2020/0184168 A1    Jun. 11, 2020

(51) Int. Cl.
*G06K 7/10*        (2006.01)
*G06K 7/14*        (2006.01)

(52) U.S. Cl.
CPC ......... *G06K 7/1417* (2013.01); *G06K 7/1413* (2013.01)

(58) Field of Classification Search
CPC ... G06K 7/1417; G06K 7/1439; G06K 7/1473
USPC ............. 235/462.1, 462.09, 462.15, 462.25
See application file for complete search history.

(56) References Cited

U.S. PATENT DOCUMENTS

| | | | | |
|---|---|---|---|---|
| 5,929,418 A | * | 7/1999 | Ehrhart | G06K 7/10851 235/462.27 |
| 7,637,433 B1 | * | 12/2009 | Zhu | G06K 7/10712 235/462.01 |
| 2004/0222300 A1 | * | 11/2004 | Strickland | G05B 19/042 235/462.15 |
| 2004/0222301 A1 | * | 11/2004 | Willins | G02B 26/105 235/472.01 |
| 2005/0103846 A1 | * | 5/2005 | Zhu | G06K 7/10732 235/462.07 |
| 2008/0168267 A1 | * | 7/2008 | Bolen | G06F 1/1626 713/100 |
| 2008/0211427 A1 | * | 9/2008 | Budde | H05B 37/0272 315/294 |

* cited by examiner

*Primary Examiner* — Daniel St. Cyr

(57) ABSTRACT

A method of dynamically configuring a data capture device includes: at a data capture controller, responsive to enabling a configuration mode, controlling a data capture assembly of the data capture device to initiate a data capture operation to capture a barcode; at the data capture controller, determining a symbology of the captured barcode based on a master set of symbology definitions; at the data capture controller, updating an active subset of the master set of symbology definitions to include the determined symbology; at the data capture controller, responsive to disabling the configuration mode, decoding subsequently captured barcodes based only on the active subset of symbology definitions.

17 Claims, 4 Drawing Sheets

DYNAMIC DATA CAPTURE DEVICE CONFIGURATION

BACKGROUND

Barcode scanners may be enabled to detect a wide variety of barcode symbologies. In a given deployment, however, it may be desirable to capture only barcodes having certain symbologies. Time-consuming and error-prone manual selection of those certain symbologies may be required. Errors in such manual configuration, or the lack of such configuration, can lead to reduced scanner performance and erroneous scanning results.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
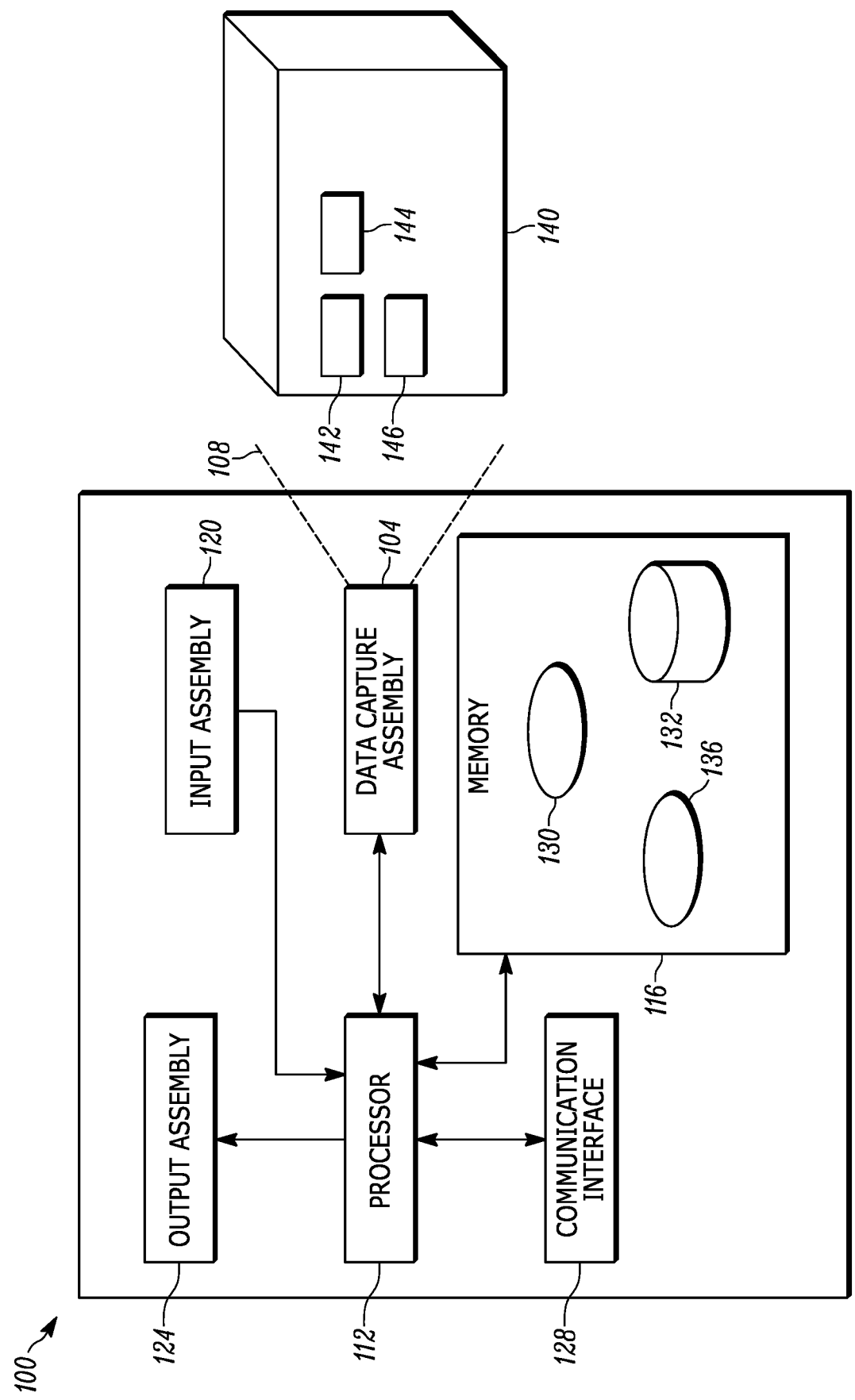
FIG. 1 is a schematic of a data capture device.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method of dynamically configuring a data capture device, the method comprising: at a data capture controller, responsive to enabling a configuration mode, controlling a data capture assembly of the data capture device to initiate a data capture operation to capture a barcode; at the data capture controller, determining a symbology of the captured barcode based on a master set of symbology definitions; at the data capture controller, updating an active subset of the master set of symbology definitions to include the determined symbology; at the data capture controller, responsive to disabling the configuration mode, decoding subsequently captured barcodes based only on the active subset of symbology definitions.

Additional examples disclosed herein are directed to a data capture device, comprising: a data capture assembly; and a data capture controller configured to responsive to enabling a configuration mode, control the data capture assembly to initiate a data capture operation to capture a barcode; determine a symbology of the captured barcode based on a master set of symbology definitions; update an active subset of the master set of symbology definitions to include the determined symbology; responsive to disabling the configuration mode, decode subsequently captured barcodes based only on the active subset of symbology definitions.

Further examples disclosed herein are directed to a non-transitory computer-readable storage medium storing computer-readable instructions executable by a processor of a data capture device to: responsive to enabling a configuration mode, control a data capture assembly of the data capture device to initiate a data capture operation to capture a barcode; determine a symbology of the captured barcode based on a master set of symbology definitions; update an active subset of the master set of symbology definitions to include the determined symbology; responsive to disabling the configuration mode, decode subsequently captured barcodes based only on the active subset of symbology definitions.

FIG. 1 depicts an example data capture device 100 in accordance with the teachings of this disclosure. The data capture device includes a data capture module 104 controllable to capture barcodes within a field of view 108. The data capture module 104 includes any suitable one of, or any suitable combination of, imaging sensors, light emitters (e.g. laser emitters), reflectors and the like enabling the data capture module 104 to capture barcodes within the field of view 108 for decoding and subsequent processing.

The data capture device 100 also includes a central processing unit (CPU), also referred to as a processor 112, interconnected with a non-transitory computer readable storage medium, such as a memory 116. The memory 116 includes any suitable combination of volatile memory (e.g. Random Access Memory ("RAM")) and non-volatile memory (e.g. read only memory ("ROM"), Electrically Erasable Programmable Read Only Memory ("EEPROM"), flash memory). In general, the processor 112 and the memory 116 each comprise one or more integrated circuits.

The data capture device 100 also includes an input assembly 120 interconnected with the processor 112. The input assembly 120 is configured to receive input and provide data representative of the received input to the processor 112. The input assembly 112 can include any one of, or a suitable combination of, a trigger button, a touch screen, a keypad, a microphone and the like.

The data capture device 100 further includes an output assembly 124, such as a display (e.g. an active-matrix OLED, or AMOLED, display or the like). The output assembly 124 is configured to receive data from the processor 112 and to render or otherwise present the data (e.g. visually, audibly, or the like) to an operator of the data capture device 100. In other examples, the output assembly 124 includes one or more of a speaker, indicator light, and the like. The input assembly 120 and the output assembly 124 can be integrated, for example when the input assembly 120 includes a touch screen and the output assembly 124 includes a display.

The data capture device 100 also includes a communications interface 128 interconnected with the processor 112. The communications interface 128 includes any suitable components (e.g. transmitters, receivers, network interface controllers and the like) allowing the data capture device 100 to communicate with other computing devices, either directly or via a network. The specific components of the communications interface 128 are selected based on the type of network or other communication links that the data capture device 100 is required to communicate over.

The various components of the data capture device 100 are interconnected, for example via one or more communication buses. The device 100 also includes a power source for supplying the above-mentioned components with electrical power. In the present example, the power source includes a battery; in other examples, the power source includes a wired connection to a wall outlet or other external power source in addition to or instead of the battery. The data capture device 100 also includes a housing supporting the components mentioned above. In some examples, the housing is a unitary structure supporting all other components of the data capture device 100. In other examples, the housing is implemented as two or more distinct (e.g. separable) housing components, such as a first component comprising a pistol-grip handle including a cradle configured to receive a second component comprising the housing of a smartphone, tablet computer, or the like.

The memory 116 stores one or more applications, each including a plurality of computer readable instructions executable by the processor 112. The execution of the above-mentioned instructions by the processor 112 causes the data capture device 100 to implement certain functionality discussed herein. The processor 112, as configured via the execution of the above-mentioned applications, may be referred to as a data capture controller. The memory 116 may store, for example, a scanning application 130 enabling the processor 112 to control the data capture assembly 104 to initiate data capture operations. The processor 112 can be configured, for example, to instruct the data capture assembly 104 to initiate a data capture operation responsive to actuation of the input assembly 120.

The data capture assembly 104 performs a data capture operation by capturing data (e.g. laser reflections, image data, or the like) within the field of view 108, identifying barcodes within the captured data, and decoding any identified barcodes. For example, as illustrated in FIG. 1, an item such as a package 140 may be within the field of view 108, and thus a data capture operation may capture one or more of several barcodes on the package 140. Three example barcodes 142, 144 and 146 are shown on the package 140, each having a different symbology.

The decoded barcodes are returned to the processor 112 for subsequent processing via the execution of the application 130. Examples of subsequent processing include presentation of the decoded data via the output assembly 124, for example with the decoded data inserted in a field presented on a display. Such subsequent processing may also include transmission of the decoded data to another computing device via the communication interface 128. As will now be apparent, such subsequent processing may require only one of the barcodes 142, 144 and 146 present on the package 140. Insertion of the incorrect barcode into the above-mentioned field may cause processing errors at the data capture device 100 or another computing device.

The identification and decoding of barcodes by the data capture assembly 104 can be performed based on a repository of symbology definitions 132 (also referred to simply as the repository 132). The repository 132 are illustrated in FIG. 1 as being stored in the memory 116, but in other examples can be stored in a memory of the data capture assembly 104 itself (e.g. as a component of a microcontroller of the data capture assembly 104 responsible for capture and decoding). In some examples, the processor 112 and the memory 116 can be integrated with the data capture assembly 104, for example in the form of one or more application-specific integrated circuits (ASICs).

The symbology definitions in the repository 132 contain data defining one or more barcode symbologies, including data used by the data capture assembly 104 to identify barcodes in data captured within the field of view 108, as well as data used by the data capture assembly 104 to decode barcodes identified in the captured data. A wide variety of symbologies may be represented in the repository 132, including linear symbologies (e.g. Interleaved 2of5, Code 39, and the like), and two-dimensional symbologies (e.g. Data Matrix, PDF417, and the like).

The memory 116 also stores a data capture configuration application 136. When executed by the processor 112, the configuration application 136 configures the processor 112 to enable or disable a configuration mode of the data capture assembly 104. The complete set of symbology definitions in the repository 132 is referred to as a master set of symbology definitions. As will be discussed below, the data capture device 100 is configured to generate or update an active subset of the above-mentioned master set, based on barcodes captured by the data capture assembly 104 while the configuration mode is enabled. The active subset of symbology definitions, in other words, typically does not include every symbology definition in the repository 132.

Following termination of the configuration mode, when the data capture assembly 104 performs a data capture operation, only barcodes in the field of view 108 that match a symbology definition of the active subset are returned, e.g. to the processor 112 for further processing via execution of the application 130. Barcodes having symbologies that do not match definitions in the active subset, even if they match definitions in the master set, are ignored (e.g. not detected at all by the data capture assembly 104) or discarded. The level at which a barcode having a non-active symbology is ignored or discarded can vary. For example, barcodes having inactive symbologies can be detected but not decoded at the data capture assembly 104. In other examples, barcodes having inactive symbologies can be detected and decoded at the data capture assembly 104, but not returned to the processor 112 for further handling by the application 130. In further examples, barcodes having inactive symbologies can be detected, decoded and returned to the processor 112, but discarded by the processor 112 before further handling by the application 130 has been performed.

Figure 2:
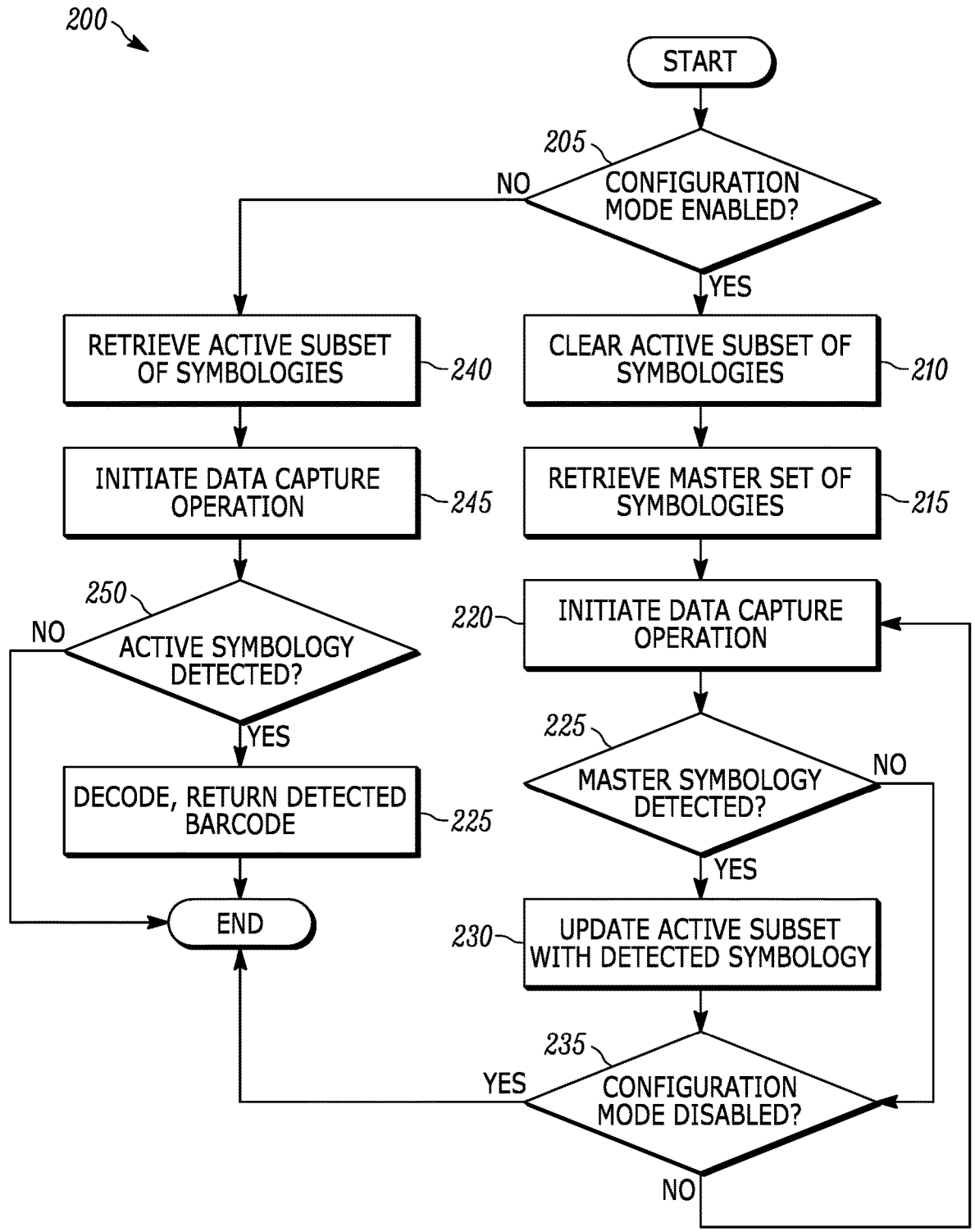
FIG. 2 is a flowchart of a method for configuring a data capture device.

Turning now to FIG. 2, a method 200 of dynamically configuring a data capture device is illustrated. The method 200 will be described in conjunction with its performance on the data capture device 100, with reference to the components of FIG. 1.

Figure 3A:
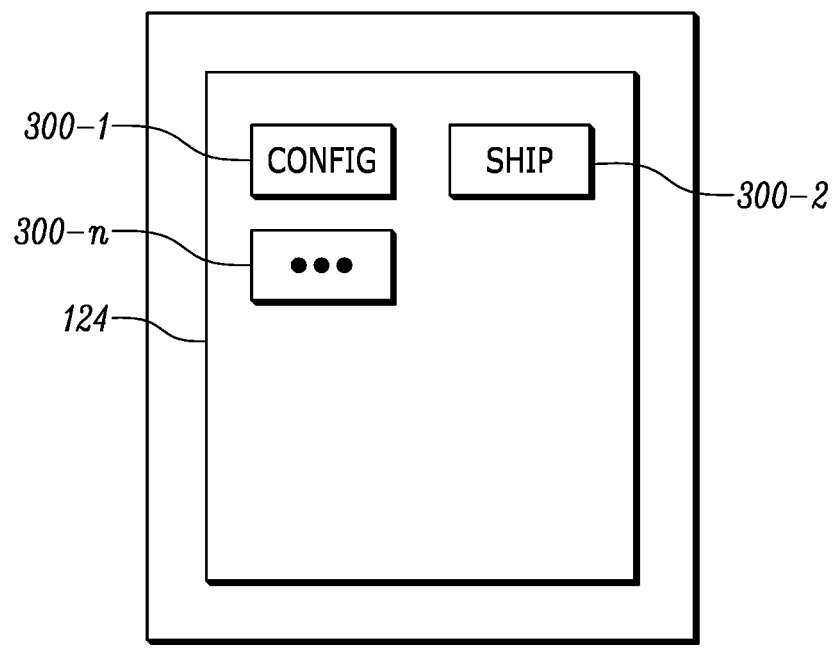
FIG. 3A is a diagram illustrating selectable interface elements for initiating the performance of the method of FIG. 2.

At block 205, the processor 112 is configured to determine whether a configuration mode is enabled or disabled. The determination at block 205 can be made, for example, based on whether execution of the configuration application 136 has been initiated. For example, referring briefly to FIG. 3A, the processor 112 can be configured to control the output assembly 124 to present a plurality of selectable icons 300-1, 300-2, . . . 300-n, each of which is selectable via the input assembly 120 to launch an application. In particular, the icon 300-1 launches the configuration application 136, while the icon 300-2 launches the application 130 (e.g. an application for use in a shipping department, in which barcodes are captured from items such as the package 140 and sent to a database for storage). The determination at block 205 can include a determination of whether the icon 300-1 has been selected.

When the determination at block 205 is affirmative (i.e. when the configuration mode is enabled, or active), the processor 112 is configured to proceed to block 210. At block 210, the processor 112 can be configured to clear an active subset of symbology definitions stored in the memory 116. The data capture device 100 stores, e.g. in the memory 116, activity indicators corresponding to each of the symbology definitions in the repository 132. The activity indicators can be stored in the repository 132 itself, or as a separate repository. Each activity indicator is configurable between an active state and an inactive state. The active state indicates that during data capture operations when the configuration mode is disabled, barcodes having the corresponding symbology will be detected, decoded and returned for further processing. The inactive state, by contrast, indicates that during data capture operations when the configuration mode is disabled, barcodes having the corresponding symbology will not be returned (i.e. will be ignored or discarded). An example set of symbology activity indicators is shown below in Table 1.

TABLE 1

| Symbology Activity Indicators | |
|---|---|
| Symbology | Active |
| Interleaved 2of5 | No |
| Code 39 | No |
| Data Matrix | No |
| PDF417 | No |

As seen above, four activity indicators are stored in the memory 116 corresponding to four symbology definitions in the repository 132. As will be apparent, when the repository 132 includes additional symbology definitions, additional activity indicators are also stored. The indicators of Table 1 indicate that none of the symbology definitions in the repository 132 are active, meaning that no data capture operations will return decoded data for further processing. Clearing the active subset at block 210 can include setting the indicators to "no" as shown in Table 1 for all symbologies. In other examples, a list of symbology identifiers for only the active subset can be maintained, and clearing the active subset can include deleting the list or removing all entries therefrom.

Figure 3B:
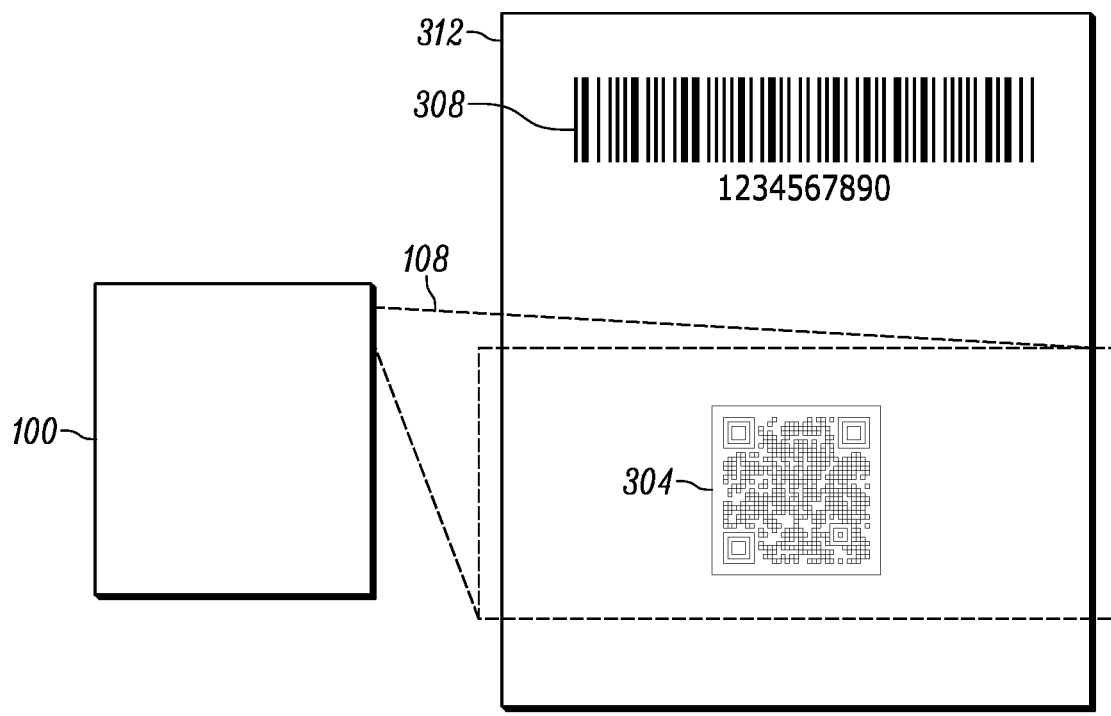
FIG. 3B is a diagram illustrating a data capture operation in the method of FIG. 2.

At block 215, the data capture device 100 is configured to retrieve the master set of symbology definitions, for use in block 220, at which a data capture operation is initiated. The data capture operation can be initiated, for example, by activation of the input assembly 120. The data capture operation, as noted above, includes the capture of data such as laser scan reflections, image data, or the like, from the field of view 108. FIG. 3B illustrates an example data capture operation in which a barcode 304 is within the field of view 108 and is therefore captured at block 220. The barcode 304, along with a second barcode 308, is presented on a reference sheet 312 employed during the configuration of the data capture device 100. In other examples, the reference sheet 312 need not be employed, and the barcode(s) captured at block 220 can be placed on any surface.

At block 225, following initiation of the data capture operation, the data capture assembly 104 is configured to determine whether any barcodes are present in the captured data. The determination at block 225 is based on the master set of symbology definitions retrieved at block 215 (i.e. all symbology definitions in the repository 132). In the present example, the barcode 304 is a Data Matrix code, and the repository 132 contains a symbology definition for Data Matrix codes. Therefore, the determination at block 225 is affirmative, as the data capture assembly 104 is able to detect and decode the barcode 304 based on the master set of symbology definitions from the repository 132.

Following an affirmative determination at block 225, at block 230 the data capture device 100 is configured to update the active subset of symbology definitions to include the symbology identified at block 225. In the present example, therefore, at block 230 the activity indicators are updated as shown below in Table 2:

TABLE 2

| Updated Symbology Activity Indicators | |
|---|---|
| Symbology | Active |
| Interleaved 2of5 | No |
| Code 39 | No |
| Data Matrix | Yes |
| PDF417 | No |

As shown in Table 2, following the above example performance of block 230, the activity indicator corresponding to the Data Matrix definition in the repository 132 has been set to the active state. The data capture device 100 is then configured, at block 235, to determine whether the configuration mode has been disabled. As will be apparent from FIG. 2, following a negative determination at block 225 (i.e. when no barcodes are detected in the field of view 108) the data capture device 100 proceeds directly to block 235.

Disabling of the configuration mode can be implemented in various ways. For example, input data received from the input assembly 120 terminating execution of the configuration application 136 can result in an affirmative determination at block 235. In other examples, the configuration mode can be disabled following a predefined period of inactivity while the configuration mode is active. When the determination at block 235 is affirmative, the method 200 terminates, and another iteration of the method 200 can begin.

Figure 4A:
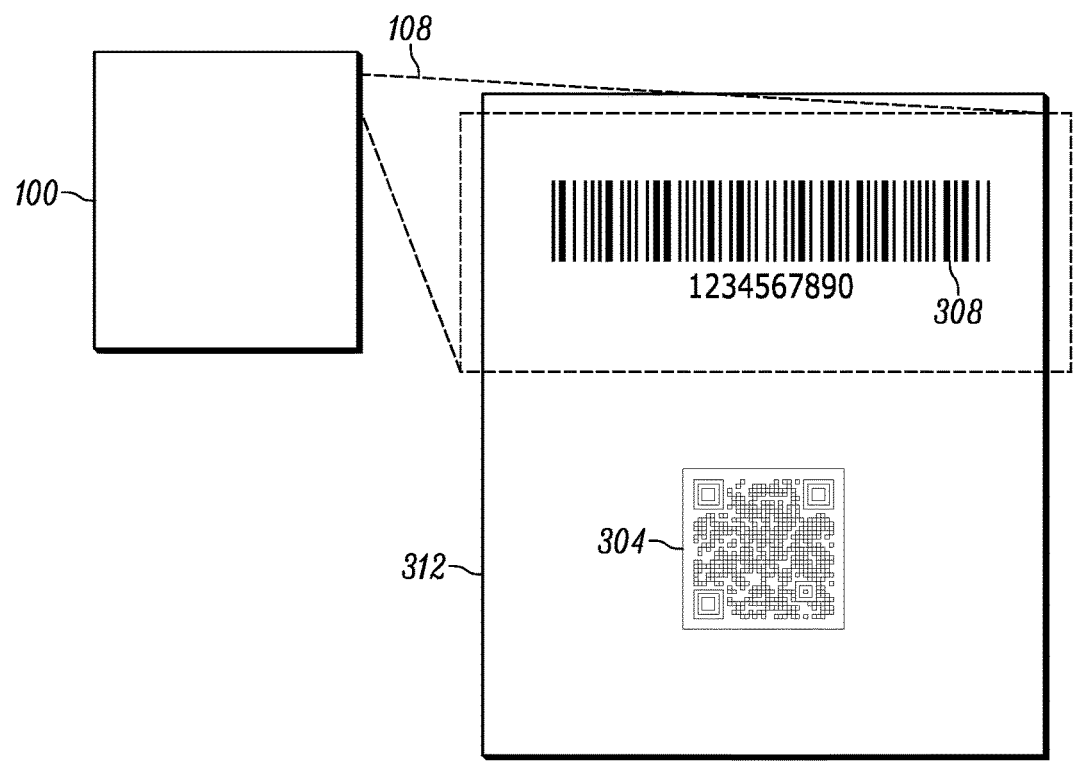
FIG. 4A is a diagram illustrating a further data capture operation in the method of FIG. 2.

When the determination at block 235 is negative, however (e.g. when the application 136 has not been terminated, and/or the above-mentioned period of inactivity has not elapsed), the data capture device returns to block 220. FIG. 4A illustrates a further performance of block 220, in which the field of view 108 has been placed over the barcode 308 of the reference sheet. At block 225, the determination is again affirmative, as the barcode 308 is an interleaved 2of5 code, which corresponds to a symbology definition in the repository 132. Returning to FIG. 2, therefore, the data capture device 100 again proceeds to block 230, and updates the activity indicator corresponding to the interleaved 2of5 symbology. The updated activity indicators therefore appear as shown below in Table 3:

TABLE 3

| Updated Symbology Activity Indicators | |
|---|---|
| Symbology | Active |
| Interleaved 2of5 | Yes |
| Code 39 | No |

TABLE 3-continued

Updated Symbology Activity Indicators

| Symbology | Active |
|---|---|
| Data Matrix | Yes |
| PDF417 | No |

At a further performance of block 235, it is assumed that the configuration mode is disabled (e.g. execution of the configuration application 136 is terminated). The determination at block 235 is therefore affirmative, and the performance of the method 200 ends.

An additional performance of the method 200 will now be described, following the above performance of the method 200 to place the symbology activity indicators in the states shown in Table 3. In particular, at block 205 it is assumed that the configuration application 136 has not been launched. Instead, for example, the icon 300-2 shown in FIG. 3A has been selected for executing the application 130. Therefore, the data capture device 100 proceeds from block 205 to block 240. At block 240, rather than retrieving all the symbology definitions in the repository 132, as at block 215, the data capture device 100 is configured to retrieve only the active subset of symbology definitions (i.e. only the definitions having active indicators as shown in Table 3). Thus, in the present performance of block 240, only the symbology definitions for interleaved 2of5 and Data Matrix codes are retrieved.

Figure 4B:
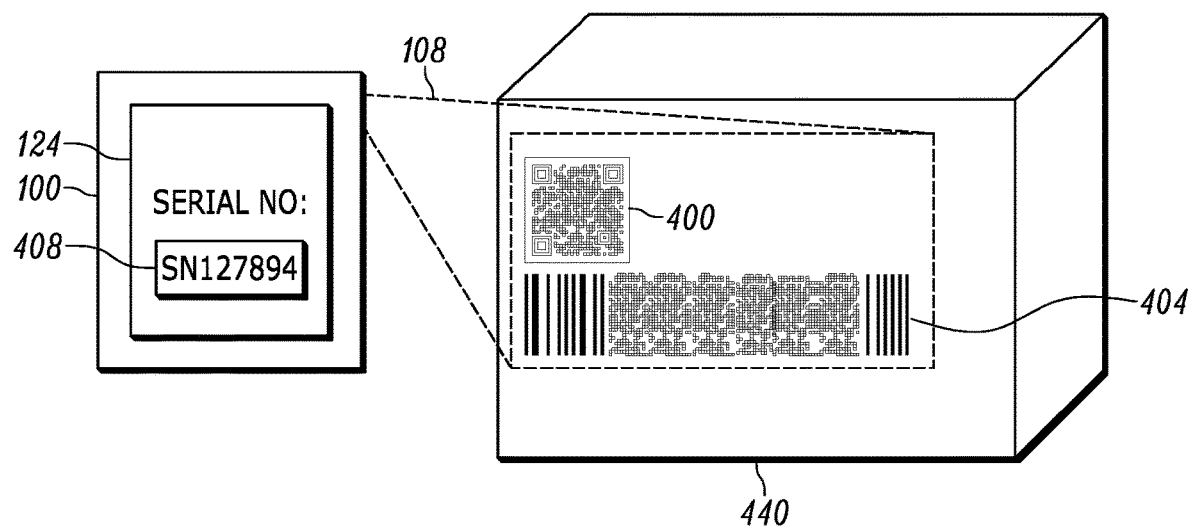
FIG. 4B is a diagram illustrating another data capture operation in the method of FIG. 2.

At block 245, the data capture device 100 is configured to initiate a data capture operation, as described at block 220, and at block 250 the data capture device 100 is configured to determine whether any barcodes are detected in the field of view that match a symbology definition loaded at block 240 (i.e. one of the active symbologies). Turning to FIG. 4B, an example performance of block 245 is illustrated, in which the field of view 108 encompasses a portion of a package 440 bearing barcodes 400 and 404. The barcode 400 is a Data Matrix code, while the barcode 404 is a PDF417 code. Thus, the determination at block 250 is affirmative, because the Data Matrix symbology is active. The barcode 404, meanwhile, is ignored or discarded, because the PDF417 symbology is not active in the present example.

When the determination at block 250 is negative, performance of the method 200 ends. At block 255, following an affirmative determination at block 250, the barcode identified at block 245 and 250 having an active symbology is returned, e.g. for insertion into a field 408 generated by the application 130.

Variations to the above functionality are contemplated. For example, in some implementations block 210 can be omitted or modified. For example, rather than clearing the active subset of symbologies at block 210, the data capture device 100 can be configured retain a previous active subset, and add any codes captured via blocks 220 and 225 to the active subset. In further examples, selectable elements can be presented via execution of the application 136 to set a type of configuration mode. Examples of configuration types include a reset type in which block 210 is performed, an additive type in which the previous active subset is retained and added to, and a subtractive type in which the previous active subset is retained, and symbologies detected at blocks 220 and 225 are removed from the active subset rather than added to it.

In further variations, in addition to activity indicators, the data capture device 100 can be configured to store configuration parameters for each active symbology. Examples of such parameters can include specific code lengths (e.g. Interleaved 2of5 with a length of 14 characters) or ranges of lengths, specific encoding modes, the presence of absence of auxiliary code features (e.g. the presence of supplemental EAN-2 codes in association with the EAN symbology) and the like. In such embodiments, only barcodes having both the active symbology and the corresponding configuration parameters are returned for further processing at block 255.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of dynamically configuring a data capture device, the method comprising:
    at a data capture controller, responsive to enabling a configuration mode, controlling a data capture assembly of the data capture device to initiate a data capture operation to capture a barcode;
    at the data capture controller, determining a symbology of the captured barcode based on a master set of symbology definitions;
    at the data capture controller, updating an active subset of the master set of symbology definitions to include the determined symbology, wherein updating the active subset includes storing a list of symbology identifiers corresponding to the master set of symbology definitions, each symbology identifier having a corresponding activity indicator, and setting the activity flag corresponding to the determined symbology to an active state;
    at the data capture controller, responsive to disabling the configuration mode, decoding subsequently captured barcodes based only on the active subset of symbology definitions.

2. The method of claim 1, further comprising:
    at the data capture controller, when one of the subsequently captured barcode does not match one of the active subset of symbology definitions, discarding the subsequently captured barcode.

3. The method of claim 1, further comprising:
    at the data capture controller, when one of the subsequently captured barcode does not match one of the active subset of symbology definitions, ignoring the subsequently captured barcode.

4. The method of claim 1, further comprising:
    initiating the data capture operation responsive to receiving an input from an input assembly of the data capture device.

5. The method of claim 1, further comprising:
    while the configuration mode remains active, initiating a further data capture operation, determining a further symbology and updating the active subset to include the further symbology.

6. The method of claim 1, further comprising:
    enabling the configuration mode responsive to an input from an input assembly of the data capture device.

7. The method of claim 6, further comprising:
    disabling the configuration mode responsive to a further input.

8. The method of claim 1, further comprising:
    responsive to enabling of the configuration mode, clearing the active subset of symbology definitions.

9. A data capture device, comprising:
    a data capture assembly; and
    a data capture controller configured to
        responsive to enabling a configuration mode, control the data capture assembly to initiate a data capture operation to capture a barcode;
        determine a symbology of the captured barcode based on a master set of symbology definitions;
        update an active subset of the master set of symbology definitions to include the determined symbology by storing a list of symbology identifiers corresponding to the master set of symbology definitions, each symbology identifier having a corresponding activity indicator, and setting the activity flag corresponding to the determined symbology to an active state;
        responsive to disabling the configuration mode, decode subsequently captured barcodes based only on the active subset of symbology definitions.

10. The data capture device of claim 9, wherein the data capture controller is further configured to:
    when one of the subsequently captured barcode does not match one of the active subset of symbology definitions, discard the subsequently captured barcode.

11. The data capture device of claim 9, wherein the data capture controller is further configured:
    at the data capture controller, when one of the subsequently captured barcode does not match one of the active subset of symbology definitions, ignore the subsequently captured barcode.

12. The data capture device of claim 9, wherein the data capture controller is further configured to:
    initiate the data capture operation responsive to receiving an input from an input assembly of the data capture device.

13. The data capture device of claim 9, wherein the data capture controller is further configured to:
    while the configuration mode remains active, initiate a further data capture operation, determine a further symbology and update the active subset to include the further symbology.

14. The data capture device of claim 9, wherein the data capture controller is further configured to:
    enable the configuration mode responsive to an input from an input assembly of the data capture device.

15. The data capture device of claim 14, wherein the data capture controller is further configured to:
   disable the configuration mode responsive to a further input.

16. The data capture device of claim 9, wherein the data capture controller is further configured to:
   responsive to enabling of the configuration mode, clear the active subset of symbology definitions.

17. A non-transitory computer-readable storage medium storing computer-readable instructions executable by a processor of a data capture device to:
   responsive to enabling a configuration mode, control a data capture assembly of the data capture device to initiate a data capture operation to capture a barcode;
   determine a symbology of the captured barcode based on a master set of symbology definitions;
   update an active subset of the master set of symbology definitions to include the determined symbology by storing a list of symbology identifiers corresponding to the master set of symbology definitions, each symbology identifier having a corresponding activity indicator, and setting the activity flag corresponding to the determined symbology to an active state; responsive to disabling the configuration mode, decode subsequently captured barcodes based only on the active subset of symbology definitions.

* * * * *